(12) United States Patent
Durbin (10) Patent No.: US 7,699,325 B2
(45) Date of Patent: Apr. 20, 2010

(54) STEERABLE AND CONVERTIBLE RUNNING STROLLER

(76) Inventor: Gregory P. Durbin, 16602 Golden Rod La., Morrison, CO (US) 80465

(*) Notice: Subject to any disclaimer, the term of this patent is extended or adjusted under 35 U.S.C. 154(b) by 278 days.

(21) Appl. No.: 11/745,437

(22) Filed: May 7, 2007

(65) Prior Publication Data
US 2007/0267833 A1 Nov. 22, 2007

Related U.S. Application Data (60) Provisional application No. 60/746,596, filed on May 5, 2006.

(51) Int. Cl.
*B62B 3/00* (2006.01)
(52) U.S. Cl. ............. 280/47.11; 280/47.38; 280/87.043
(58) Field of Classification Search .................. 280/642, 280/647, 658, 47.38, 11, 23.1, 33.993, 43.19, 280/124.12, 47.25, 87.01, 87.021, 87.041, 280/87.043; 414/793.9
See application file for complete search history.

(56) References Cited

U.S. PATENT DOCUMENTS

| | | | | |
|---|---|---|---|---|
| 4,359,231 A | * | 11/1982 | Mulcahy | 280/87.01 |
| 4,674,762 A | * | 6/1987 | Nelson et al. | 280/282 |
| 5,624,128 A | * | 4/1997 | Owens | 280/250.1 |
| 5,931,244 A | * | 8/1999 | Renfroe et al. | 180/6.32 |
| 6,572,130 B2 | * | 6/2003 | Greene et al. | 280/266 |
| 6,626,446 B1 | * | 9/2003 | Yosef | 280/47.38 |
| 7,073,822 B1 | * | 7/2006 | Renfroe et al. | 280/771 |
| 7,178,813 B1 | * | 2/2007 | Bruntmyer | 280/87.041 |
| 7,377,527 B2 | * | 5/2008 | Cunningham | 280/47.38 |
| 2004/0090043 A1 | * | 5/2004 | Jane Santamaria | 280/642 |
| 2004/0173989 A1 | * | 9/2004 | Brichet et al. | 280/270 |
| 2006/0261575 A1 | * | 11/2006 | Ehrenreich et al. | 280/643 |
| 2007/0069504 A1 | * | 3/2007 | Lan | 280/642 |

* cited by examiner

*Primary Examiner*—Glenn Dayoan
*Assistant Examiner*—Brodie Follman
(74) *Attorney, Agent, or Firm*—Gregory P. Durbin (57) ABSTRACT

A steerable stroller including a rear frame assembly supporting two rear wheels and a front frame assembly, which may take the form of a boom or other frame work, pivotally coupled with the rear frame assembly and supporting a front wheel. A centering mechanism is provided that elastically couples the front frame assembly with the rear frame assembly so that the boom and front wheel are normally in a straight orientation with respect to the rear wheels, and when a user imparts a turning force the centering mechanism acts to return the boom and front wheel to the straight orientation when the force is reduced or removed. It is also possible to include a pivoting front wheel in conjunction with or separate from the pivoting boom, with pivoting wheel also including a centering mechanism. Finally, the steerable running stroller may include a removable seat assembly.

19 Claims, 11 Drawing Sheets

Fig. 13 (Straight Orientation)

Fig. 14

STEERABLE AND CONVERTIBLE RUNNING STROLLER

CROSS REFERENCE TO RELATED APPLICATION

The present application is a non-provisional application claiming priority under 35 U.S.C. 119(e) to co-pending provisional application No. 60/746,596 titled "Steerable and Convertible Running Stroller" filed on May 5, 2006, which is hereby incorporated by reference herein.

FIELD OF THE INVENTION

Aspects of the present invention involve a stroller, and particularly a running stroller with a steering assembly. Aspects of the present invention also involve a convertible stroller that allows a user to configure the stroller in single seat, double seat, and other seating configurations.

BACKGROUND

Strollers are a popular option for parents to transport young children. So called "jogging strollers" were developed as a way for parents to go for a jog and take their young children. Jogging strollers may also be used in the same manner as a conventional stroller to transport children in a shopping center, etc. One significant drawback of conventional jogging strollers is that they have three fixedly mounted wheels and there is no way to steer the stroller. As such, while walking, jogging or running, it is difficult to turn the stroller. Often a parent has to pivot the front wheel off of the ground by pressing down on handles at the rear of the stroller in order to steer the stroller. Steering difficulty is exaggerated for heavier children and in double jogging strollers, i.e., those adapted to carry two children.

Some jogging strollers are available with a front caster wheel, such as on a typical grocery store shopping cart, only larger. However, popular literature counsels against use of these strollers for actual jogging as the caster wheel is unstable. These strollers are more adapted for use as a substitute for a conventional stroller or perhaps for taking a casual walk. For jogging or running, some models provide for locking the caster wheel so that it is prohibited from swiveling. There does not appear to be any way to actively stably steer the stroller by controlling the castor wheel.

Conventional jogging strollers typically may be purchased as single strollers, i.e., those having only a single seat, double strollers, i.e., those having two seats, and even triple strollers, i.e., those having three seats. This is not a know provision, however, to convert the strollers between seating configurations, Thus, parents have to purchase different types of strollers in order to transport different numbers of children.

Conventional jogging strollers, however, are not typically suited for either active steering. Further, conventional jogging strollers are not typically convertible between various seat configurations, e.g., there is no provision to substitute a single seat arrangement for a double seat arrangement. It is with these various issues in mind that various aspects of the implementations of the invention were developed.

SUMMARY

One aspect of the present invention involves a steerable stroller that includes a rear framework including a post. A first rear wheel and a second rear wheel are rotatably supported on the rear framework. A boom is pivotally supported on the post and the boom extends forwardly from the post. At least one front wheel is supported on the boom. Finally, at least one flexible and resilient member is operably coupled between the boom and the rear framework. The at least one flexible and resilient member is normally biased to orient the boom in a straight orientation with the front wheel in alignment with the first and second rear wheels. The flexible and resilient member is further arranged to impart a return force on the boom when the boom is pivoted such during a turn.

Another aspect of the present invention involves a steerable stroller with a first rear wheel and a second rear wheel rotatably supported on a rear frame assembly. A front frame assembly is pivotally coupled with the rear frame assembly, and at least one front wheel is supported on the front frame assembly. At least one seat is operably supported on the front frame assembly. Finally, a centering mechanism is coupled between the front frame assembly and the rear frame assembly. The centering mechanism is configured to normally orient the frame assembly in a straight orientation with the front wheel in alignment with the first and second rear wheels. The centering mechanism is further arranged to impart a return force on the frame assembly when the frame assembly is pivoted with respect to the rear frame assembly while executing a turn.

Finally, another aspect of the present invention involves a stroller including a rear frame assembly rotatably supporting a first rear wheel and a second rear wheel. A boom extends forwardly from the rear frame assembly, and the boom rotatably supports at least one front wheel. Finally, a seat assembly is removably coupled with the boom.

DETAILED DESCRIPTION OF EMBODIMENTS OF THE INVENTION

Aspects of the present invention involve a running stroller configured with a front wheel that may be angularly or pivotally controlled with respect to a pair of rear wheels providing stable turning during jogging or running. In one particular configuration, described in greater detail below, the stroller includes a pair of rear wheels rotatably supported to rotate about a common geometric axis defined by a rear frame assembly. The rear wheels may or may not be supported on a common physical axle. A front wheel is rotatably supported about a front axis. The front axis is defined in the front region of a boom or boom assembly. The boom extends forwardly from the rear framework. Further, the boom is pivotally coupled with the rear frame assembly. A steering interface, such as a handlebar assembly, is operably associated with the boom. By way of the pivotal connection between the boom and the rear framework, the front wheel may be pivoted left or right with respect to the rear frame and corresponding rear wheels to cause the stroller to turn during use.

Further, a centering mechanism is coupled with the boom. The centering mechanism operates to center the boom after it is pivoted left or right for a turn. As used herein, the term "centering mechanism" refers to an arrangement of components that operate to orient and maintain the boom in a straight orientation and to provide a return force on the boom when the boom is turned from a straight orientation, the return force working to orient the boom in the straight orientation. The centering mechanism may involve a discrete member or assembly that is in some form coupled between the boom, the front frame assembly, or related components of the boom and any components supporting the rear wheels. Thus, for example, the centering mechanism may be coupled with the boom, front framework, or other member, assembly, or mechanism that supports the front wheel, and further coupled with the rear framework. The centering mechanism may include one or more flexible and resilient members, such as one or more elastic members, a spring (tension or compression, leaf spring, coil spring, Belleville spring, torsion spring, rubber band, etc.) or other spring like structures, or an assembly of components displaying spring-like or elastic properties, electromechanical assemblies, hydraulic arrangements, etc. Examples of centering mechanisms are illustrated in FIGS. 1-4, 5-6, and 7-10.

Figure 2:
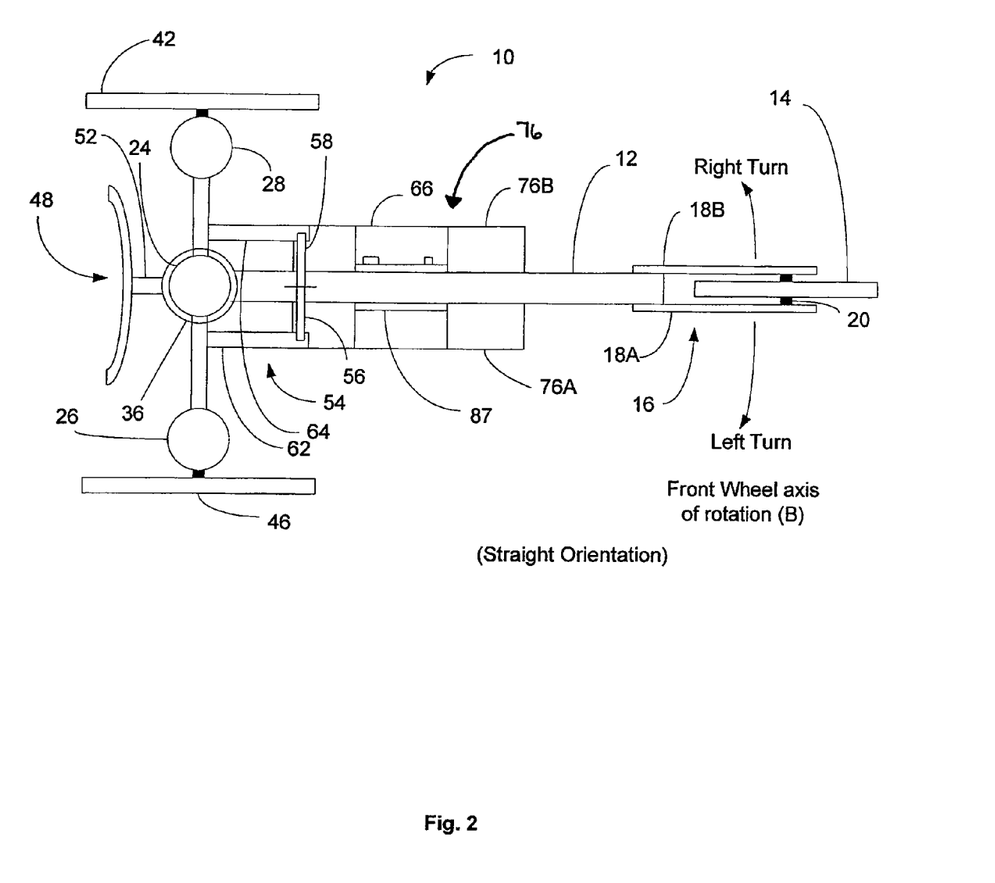
FIG. 2 is a bottom view of the jogging stroller illustrated in FIG. 1.

In one arrangement, straight forward movement of the stroller is achieved by maintaining the front axis in a substantially parallel orientation with respect to the rear axis, such as in a conventional jogging stroller. The jogger orientation set forth in FIG. 2 is in a straight orientation. Stated another way, straight forward movement of the stroller is achieved by maintaining the front wheel aligned with the rear wheels. Steering is achieved by creating an angular orientation between the front axis and the rear axis (i.e., angularly (left or right) orienting the front wheel with respect to the rear wheels). The centering mechanism operates to return the stroller to a straight orientation after and/or during steering of the stroller. Thus, if a user causes a right turn such that the boom and the front wheel are turned toward the right rear wheel (see FIG. 4), the centering mechanism causes a force that seeks to move the front of the wheel leftward (to the center position) and when a user causes a left turn such that the front of the front wheel is turned toward the left wheel, the centering mechanism causes a force that seeks to move the front wheel back to the straight orientation.

During a turn, the centering mechanism also assists in effecting the turn. By operating to return the stroller to the straightforward orientation during a turn, the centering mechanism causes the rear wheels to track or follow the turn of the front wheel. When the turning force is removed, the rear wheels align with the front wheel in the normal straight orientation. In some implementations, absent the centering mechanism, the rear wheels do not align with the front wheel after a turn.

Either in conjunction with a steering configuration or without steering, a stroller conforming to aspects of the invention may include either a fixed seating configuration or a convertible seating configuration. An implementation conforming to aspects of the invention may include a boom fixed to the rear frame assembly. Such an implementation may not include a collar and will not include a centering mechanism. Whether a fixed or convertible seating arrangement, the seating assembly is supported on the front framework. Particularly in one arrangement, the seat or seats are coupled with the boom. For a convertible seating configuration, the stroller includes a removable seat assembly. A seat assembly may be provided with one, two or more seats. Thus, to convert the stroller from a single to double configuration, for example, the single seat assembly is removed and the two seat assembly is attached to the stroller. The boom or boom assembly provides one location where the seat assembly is releasably or removably attached.

Figure 1:
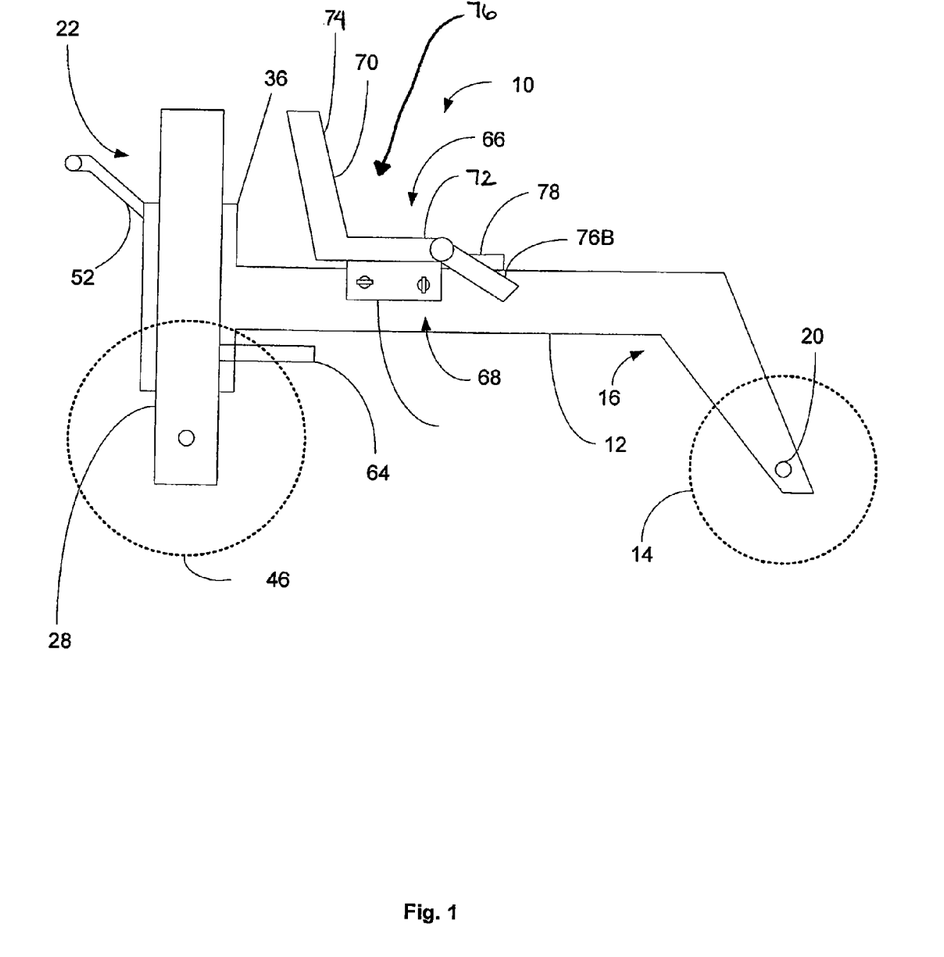
FIG. 1 is a side view of a first implementation of a steerable jogging stroller conforming to aspects of the present invention.
Figure 3:
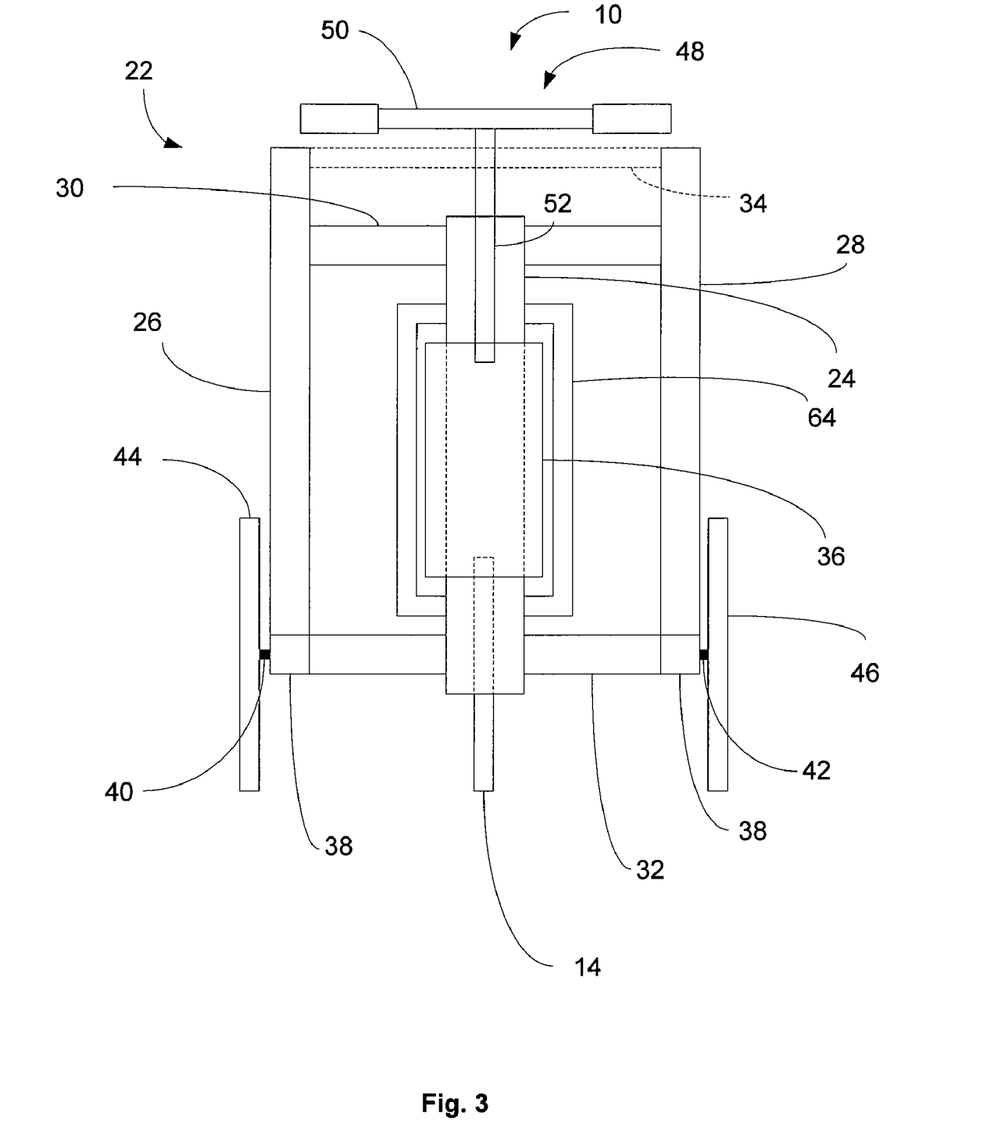
FIG. 3 is a rear view of the jogging stroller illustrated in FIG. 1.

Referring now to FIGS. 1-3, one particular example of a steerable stroller 10 will be described in greater detail. The steerable stroller includes a boom 12 or front wheel frame assembly extending forwardly from the rear frame. A front wheel 14 is rotatably supported at the front of the boom. In the FIG. 1 implementation, a fork 16 including two tines (18A, 18B) extends forwardly and downwardly at the front of the boom. An axle 20 of the front wheel is supported at the lower end of the tines such that the front wheel is between the tines. This is merely one possible implementation, others might involve a single tine supporting the axle, as well as other arrangements.

The rear frame assembly 22 includes a post 24 generally arranged along the longitudinal center line of the stroller. Note, the drawings are not presented to scale; thus, for example, the post appears with a larger diameter than might be deployed in any particular implementation. The rear frame assembly 22 includes two vertically oriented outer members (26, 28) with upper and lower frame members (30, 32) coupled between the outer members. The post is also generally vertically oriented and is coupled between the upper and lower frame members. A push bar 34, shown in dashed line in FIG. 3 but not FIGS. 1-2, may be coupled between the upper regions of the outer frame members.

The post, in one arrangement, is a cylindrical member that may be a solid or hollow tubular member. The rear portion of the boom 12 includes a collar 36 that partially or completely circumferentially engages the post such that the boom is pivotally coupled with the post, and hence the boom is pivotally coupled with the rear frame assembly. Ring bearings, one or more bearing collars or sleeves, other bearing arrangements, and other arrangements generally may be employed to facilitate the pivotal connection between the boom and the post, as well as generally between the boom and the rear frame assembly.

The rear frame further includes axle housings 38 at the outside lower rear end region of the frame. The axle housings are adapted to receive an axle 40, 42 of each rear wheel 44, 46 or a common axle thereby rotatably supporting each wheel. In one implementation, the axle housings are coupled to the outside ends of the lower tubular cross-member 32 and arranged to support the two rear wheels such the rear axles of each wheel are coaxial. It is also possible to arrange the axle housings so that the rear wheels are cambered. In such a cambered arrangement, the tops of each rear wheel are closer than the bottoms of each rear wheel.

The provision of the pivotal relationship between the rear frame and the boom allows the front wheel to be pivoted (steered) with respect to the rear wheels. A steering handle 48 or some other form of user engagement mechanism is coupled with the rear collar 36 or otherwise coupled with the boom. In the embodiment shown in FIGS. 1-3, the handle extends rearwardly of the collar and the boom extends forwardly of the collar and post. The handle includes a steering bar 50 transversely coupled to the rear end region of a handle support member 52. The handle support member is coupled with the collar. Forward force applied to the right side of the steering bar causes the boom to swing to the left while forward force on the left side of the steering bar causes the boom to swing to the right. Through the handle the user may impart steering forces sufficient to pivot the boom left or right and thus execute a left or right turn.

In the embodiment of FIGS. 1-3, a centering mechanism 54 involves a first elastic member portion 56 coupled between the rear frame 22 and the boom 12 to one side of the boom, and a second elastic member portion 58 coupled between the rear frame and the boom to the other side of the boom. The first and second elastic members may involve two separate members, or a single member. In either arrangement, the members are configured such that the front boom is normally biased to be in a straight orientation. In a straight arrangement, the front wheel and the rear wheels are aligned such that the stroller rolls in approximately a straight line. In the embodiment of FIGS. 1-3, the elastic members may be rubber or a similar synthetic material providing similar flexible resilient properties. When a single elastic member is used, it may be divided into two equal length sections (56, 58) with the center being coupled to the boom so that one side is brought into tension when boom is pivoted in the opposite direction.

Figure 4:
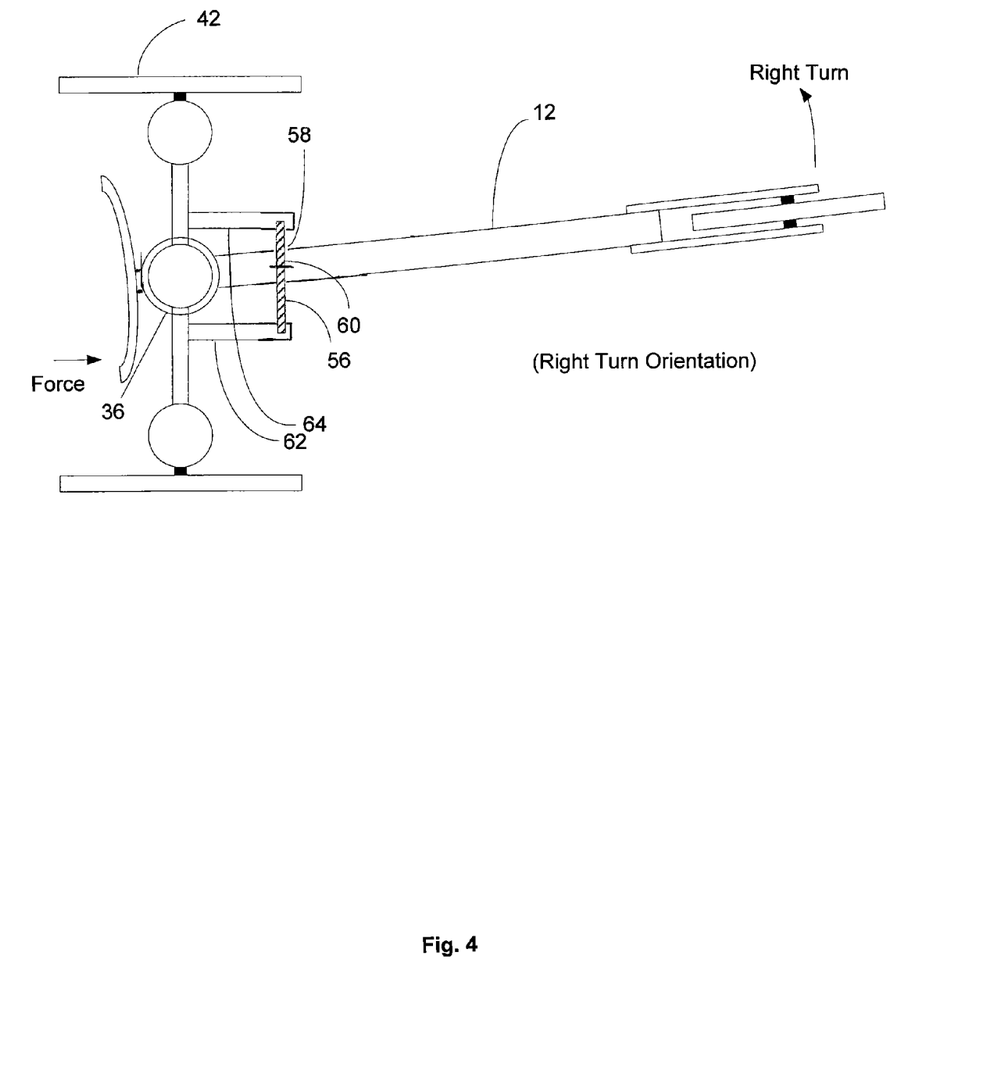
FIG. 4 is a bottom view of a jogging stroller similar to that illustrated in FIG. 1, with the boom illustrated in a right turn orientation, the FIG. 4 embodiment having a different centering mechanism and steering handle configuration.

The embodiment of FIG. 4 is similar to that shown in FIGS. 1-3. However, the embodiment of FIG. 4 employs one or more coil springs 60 as the elastic member (56, 58), and has the steering handle 50 coupled with the collar directly. Further, FIG. 4 is a bottom view of a a steerable stroller in a right turn orientation, discussed in greater detail below.

In the embodiment shown in FIG. 1, centering mechanism support members 62, 64 extend forwardly of the rear frame assembly to either side of the boom. The first elastic member portion 56 extends between the boom and the first support member 62. The second elastic member 58 extends between the boom and the second support member 64. As mentioned above, the elastic members are normally coupled with the boom, either in tension or not, in such a manner that the boom is straight. Arranged as such, during use when forward pushing force is applied by a user at or near the center of the steering member 48 (i.e., at or adjacent the connection with the handle support member) or on the push bar 34 (discussed further below), the stroller moves in a substantially straight line. When a user applies force to the steering bar to either side of the handle support member, the boom swings one way or the other, which in turn stretches one of the elastic members one way or the other. For example, referring to FIG. 4, when the user pushes on the left side of the steering bar or pulls on the right side, the boom swings right causing a right turn. The right swing of the boom stretches the left side elastic member 56. When force is removed from the steering bar, the left side elastic member pulls the boom back to its normally straight orientation. The elastic member also imparts a force between the boom and rear frame during the turn which causes the rear wheels to track or follow the front wheel.

The flexible resilient members may be elastic, natural rubber, synthetic fibrous materials, metal or alloy springs, and other materials and arrangements that provide flexible, resilient, and repeatable characteristics. In various arrangements, the flexible resilient members may be arranged such that one acts in compression while the other cooperatively acts in tension. In other arrangements, like in FIGS. 1-4, the flexible resilient members may be arranged so that each individually acts only in tension. Alternatively, an implementation may include members that primarily act in compression. Further, it is possible to employ a single flexible and resilient member or a plurality of flexible and resilient members.

As shown in FIG. 3 (and FIGS. 7-8, discussed below), it is possible to include a second handle assembly or push bar 34 (shown in dash in FIGS. 3 and 8) with a steerable jogging stroller. The second handle member, however, is not coupled with the boom. Rather, the push bar is coupled with the rear frame assembly 22. The push bar is used for predominately straight movement of the stroller or alternative steering, i.e., steering that does not rely on active movement of the boom through the first handle assembly. Forces applied along the second steering bar do not generate direct pivoting forces on the boom; thus, a user may grasp the second steering bar along any portion of its length without actively engaging the boom and without causing an active turn. The centering mechanism 54, normally biased for straight movement, substantially reduces inadvertent pivoting of the boom. It is possible, in any particular implementation, depending on the strength, orientation, neutral tension, and other factors related to the flexible resilient members or other centering mechanism arrangements, along with characteristics of the pivotal connection between boom and post, length of the boom, and others, that hand position and the amount of force applied to the second handle member may impart some indirect steering forces to the boom that will cause the boom to move away from its normally straight orientation.

Still referring to FIGS. 1-2, a seat assembly 66 is coupled with the boom 12. (FIGS. 3 and 4 do not show the seat assembly) The seat assembly may be fixed to the boom or removably coupled. When removably coupled, the seat assembly may be removed for convenient storage or transportation of the stroller. Further, a user may exchange one seat assembly for another with a different arrangement, for example, a single seat arrangement exchanged for a two seat arrangement. The two seat arrangement may provide the seats in a side-by-side configuration or in a fore and aft configuration. Depending on the length of the boom, it is also possible to provide for coupling of more than one seat assembly to the boom. In such a two seat fore and aft arrangement, described in further detail below, a first seat assembly is provided forward of a second seat assembly.

Referring to FIG. 1, the seat assembly is clamped to the boom with a clamping assembly 68. The seat assembly includes a single seat 70 positioned above the boom and forward of the rear frame assembly 22, with the longitudinal centerline of the seat substantially aligned with the longitudinal centerline of the boom. The seat assembly includes a padded seat bottom 72 with a back support 74 extending upwardly from the rear of the seat bottom. The seat bottom as shown in FIG. 1 has a seat bottom that is arranged to also support the legs and feat of small child, toddler or infant of average size. It is also possible to provide a leg and foot support assembly 76 that extends downwardly from the front of the seat bottom, such as shown in FIGS. 1-4. Various canopy configurations, not shown, may also be employed in implementations of a jogging stroller. The leg support may be in a permanent orientation, or may be pivotally coupled with the seat support so that they may be pivoted downwardly with respect to the seat bottom and arranged at various angles. In the embodiment shown in FIG. 1, there are two separate leg supports 76A, 76B that extend downwardly from the seat bottom to either side of the boom. In this arrangement, the seat bottom includes a raised portion at the front center of the seat bottom, above the boom and adjacent the rear of each leg support. Forward the raised portion, the seat assembly may include padding 78 around the boom. The padding may also be a separate piece, depending on a particular implementation.

Figure 5:
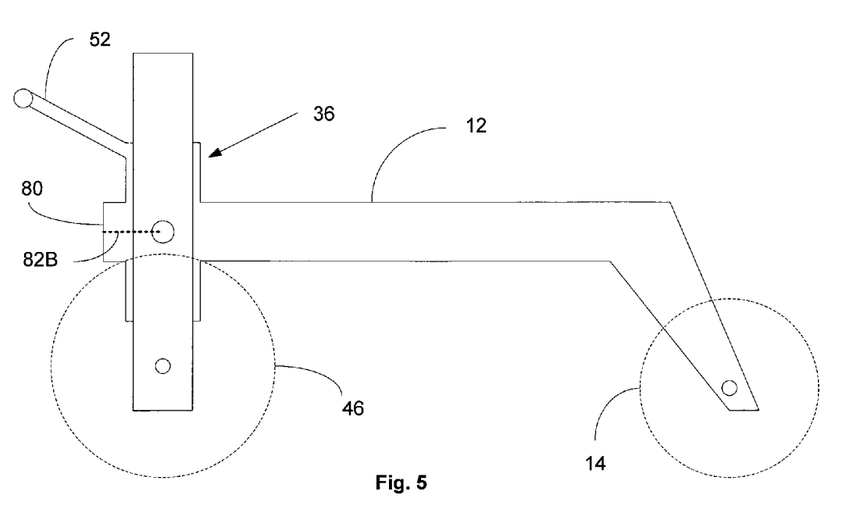
FIG. 5 is a side view first alternative implementation of a jogging stroller conforming to aspects of the present invention.
Figure 6:
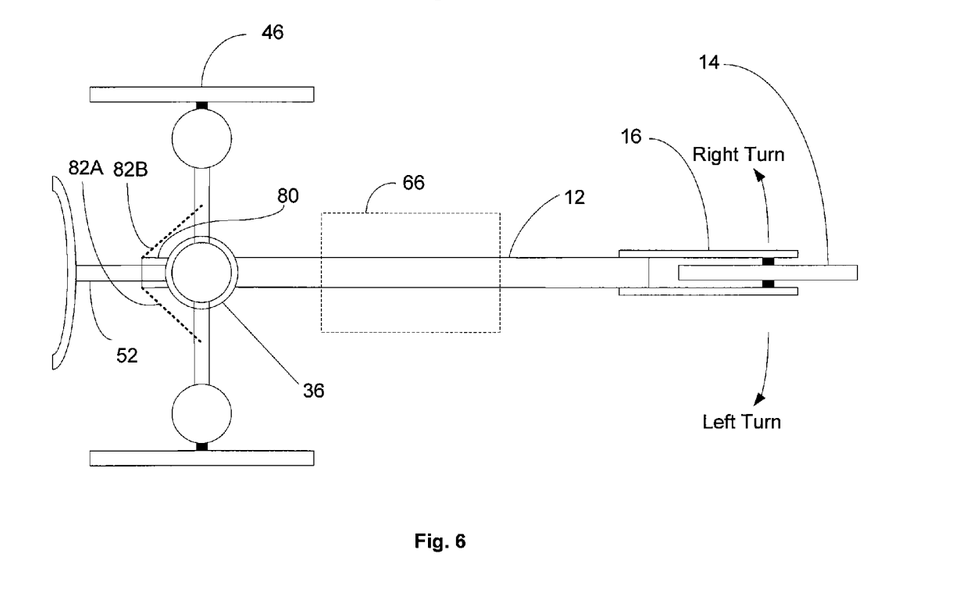
FIG. 6 is a bottom view of the jogging stroller illustrated in FIG. 5.

FIG. 5 illustrates a side view of an alternative implementation of a steerable stroller conforming to aspects of the present invention, and FIG. 6 illustrates a bottom view. Some details of the implementation of FIG. 5, for example the seat assembly, are not shown. FIG. 5 is similar to the embodiments shown in FIGS. 1-4 with the primary exception that the embodiment of FIG. 5 includes a different centering mechanism. In this embodiment, a portion 80 of the boom 12 extends rearwardly of the collar. A first elastomeric band 82A extends from one side of the rearwardly extending portion 80 of the boom to the frame assembly at the corresponding side of the running stroller, a second elastomeric band 82B extends from the opposing side of the rearwardly extending portion of the boom to the frame assembly at the corresponding side of the running stroller.

The embodiment of FIGS. 5-6 also functions similarly to the embodiments shown in FIG. 1. More particularly, when the boom is swung (rotated) left or right, one of the elastomeric bands (82A, 82B) is stretched, and when the turn force is removed, the stretched elastomeric band pulls and rotates the boom back into a straight orientation. The bands also impart a force during the turn causing the rear wheels to follow the front wheels. Different than the implementation of FIGS. 1-4, the elastomeric band operates on the rearwardly extending portion 80 of the boom rather than the forwardly extending portion of the boom. For example, in FIG. 4 the boom is swung to the right thereby extending the left portion 56 of the spring member 60. Thus, when the turning force is removed, the lower or left elastomeric member draws the boom back into a straight arrangement. Alternatively, when the boom in the embodiment of FIG. 6 is swung to the right, the right (FIG. 6) (rather than left (FIG. 2.)) elastomeric member 82B is stretched by the rearwardly extending portion 80 of the boom swinging to the left. Thus, when the turning force is removed, the stroller returns to a straight orientation by the right member pulling on the rearwardly extending portion of the boom thereby swinging the forwardly extending portion of the boom back to a straight orientation. Another distinction between the centering mechanism arrangement of the embodiment in FIGS. 1-4 has the elastomeric member arranged transverse to the boom while the embodiment in FIGS. 5-6 has the elastic members arranged at an angular orientation with respect to the boom. In either embodiment, a single elastomeric member fastened to the boom or separate elastomeric members may be employed. Moreover, spring arrangements, such as coil springs or bent spring members, may be substituted or used with the elastomeric members.

Figure 7:
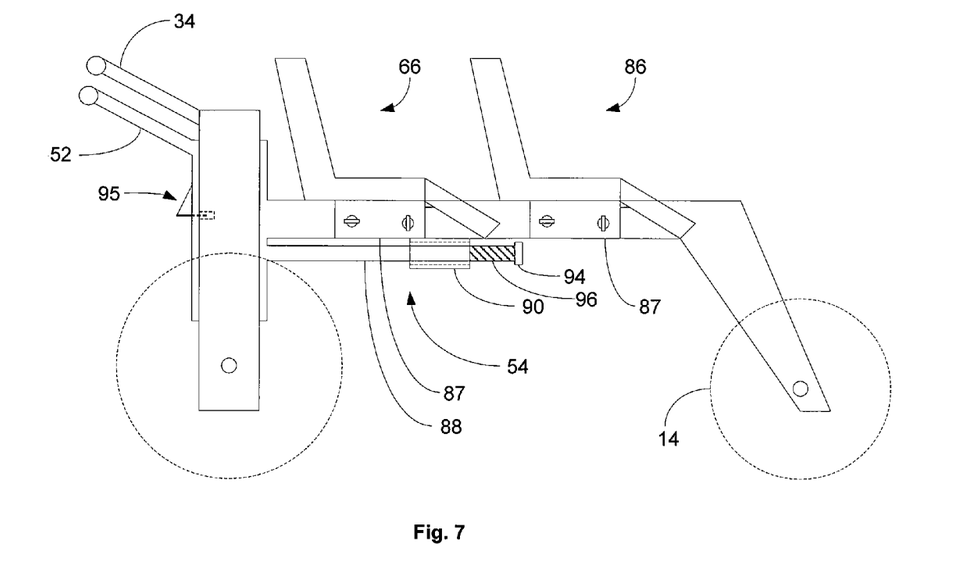
FIG. 7 is a side view of a second alternative implementation of a jogging stroller conforming to aspects of the present invention.
Figure 8:
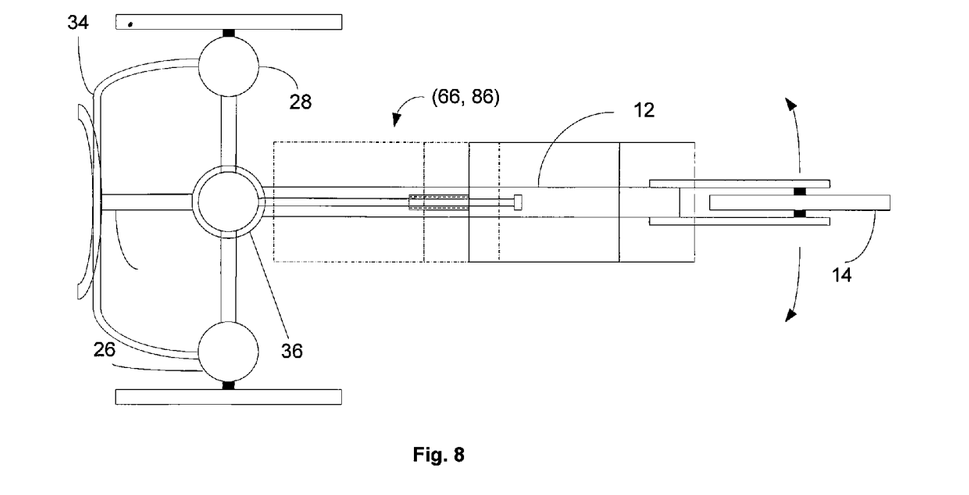
FIG. 8 is a bottom view of the jogging stroller illustrated in FIG. 7.

FIG. 7 is a side view of a second alternate implementation of a jogging stroller conforming to aspects of the present invention. FIG. 8 is a bottom view of the embodiment illustrated in FIG. 7. The implementation of FIGS. 7-8 is again similar to the implementations illustrated in FIGS. 1-6. However, the implementation of FIGS. 7-8 includes a different implementation of a centering mechanism 84, as well as illustrating an embodiment with a second seat assembly 86 arranged forwardly of the first seat assembly 66. Further, FIG. 8 includes a push bar 34 that extends rearwardly and between the upright members (26, 28).

With respect to the first seat assembly and the second seat assembly, both may be removably attached to the boom by way of a seat mounting bracket 87. The mounting bracket is coupled with the bottom of the seat assembly and include two aperatures adapted to align with corresponding apertures in the boom assembly, which receives bolts to removably secure the seat assembly(ies) to the boom. Other removable or permanent fastening arrangements may be used. It should be noted that a steerable stroller conforming to aspects of the inventions may not have removable seat assemblies. Moreover, if a different front frame assembly than a boom is used in any particular implementation, then it is possible to use other seating configurations.

Turning now to the centering mechanism 84, unlike that shown in FIGS. 1-6, the centering mechanism includes an elongate centering member 88 extending forwardly from the post. The centering member is attached to the post 24 below the collar 36 for the boom. Further, the centering member is arranged perpendicular to the rear axles. As such, the centering member follows the longitudinal center line of the stroller and defines a generally straight orientation for the stroller. The centering member is a flexible resilient metal member, which may be spring steel.

Figure 9:
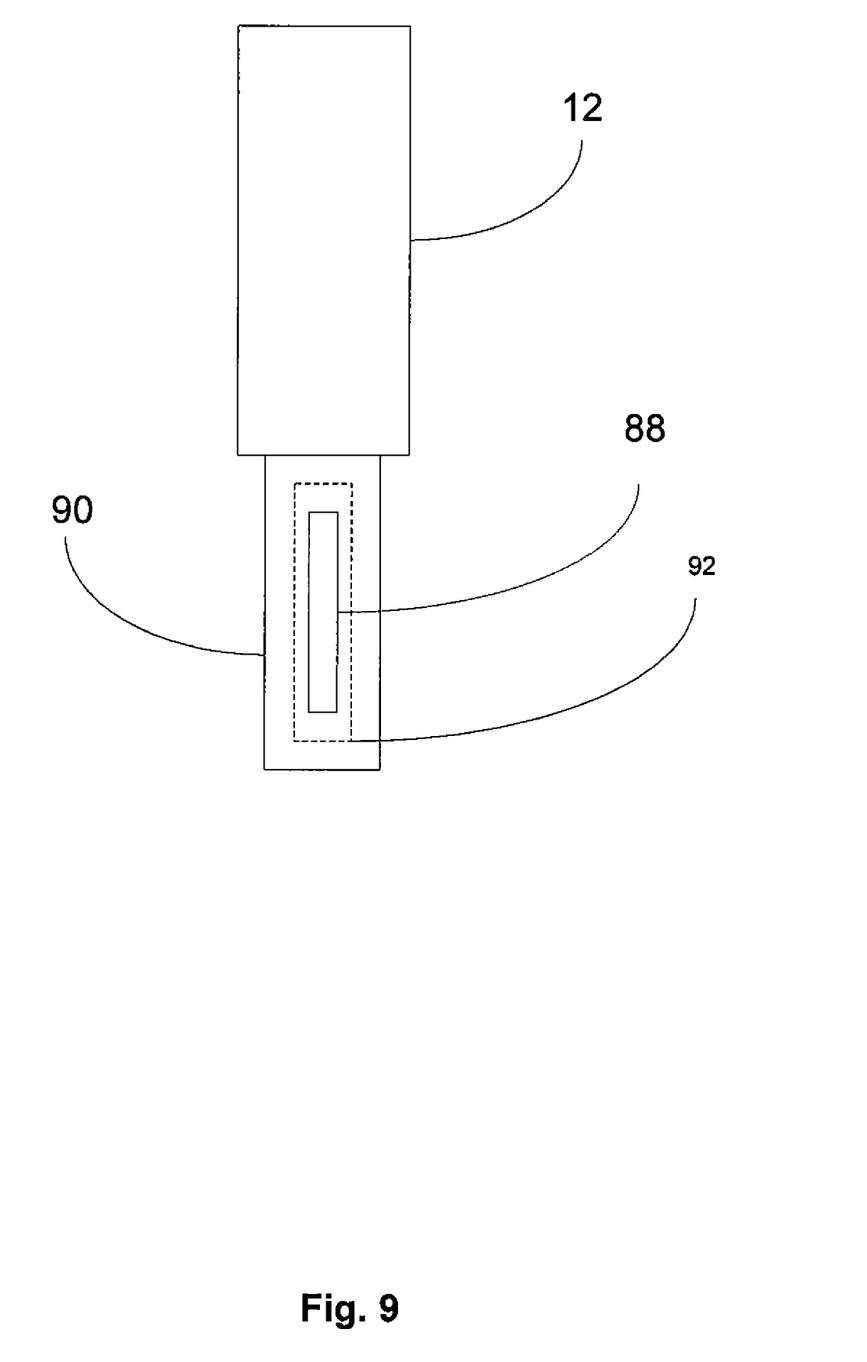
FIG. 9 is a front view of a portion of the centering mechanism of the jogging stroller illustrated in FIG. 7.

The boom includes a retaining member 90 extending downwardly from the boom. The retaining member defines an elongate channel 92 adapted to receive the centering member. The channel may be open or closed along the bottom. FIG. 9 illustrates the retaining member and the channel with a closed bottom. The forward end of the centering member includes an end cap 94 (not shown in FIG. 9) adapted to prohibit the centering member from being withdrawn through or into the retaining member channel during a turn. The separation distance between the forward end of the channel and the end cap offers the maximum angular orientation of the boom. As the boom is swung left or right during a turn, the centering member is deflected from its straight orientation and also is withdrawn into the channel. FIG. 9 illustrates a front view of the retaining member and further illustrates the centering member within the channel.

Figure 10:
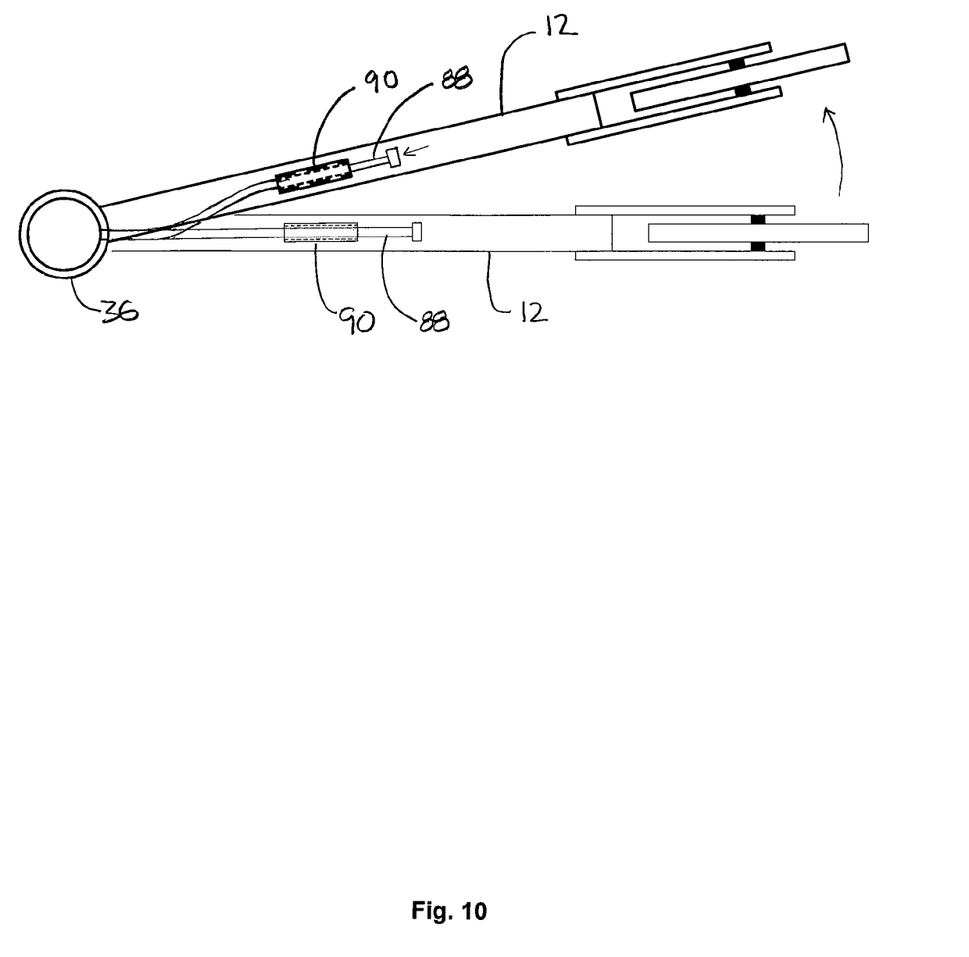
FIG. 10 is a bottom view of the boom assembly for the jogging stroller illustrated in FIG. 7, the bottom view of the boom assembly illustrating the boom in a straight arrangement (shown in a light line weight) and in a turning orientation (shown in a heavier line weight)
Figure 11:
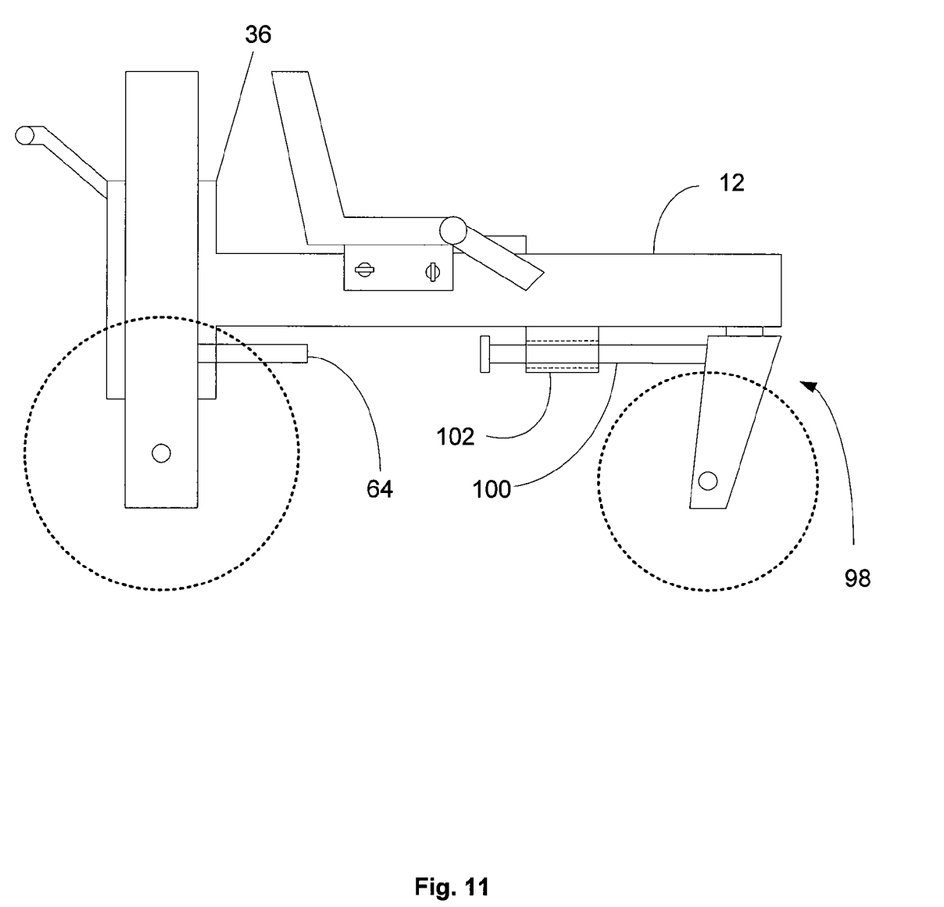
FIG. 11 is a side view of a third implementation of a steerable jogging stroller conforming to aspects of the present invention, the third implementation having a front fork assembly pivotally supported at the front of the boom so that the front wheel may turn relative to the boom.
Figure 12:
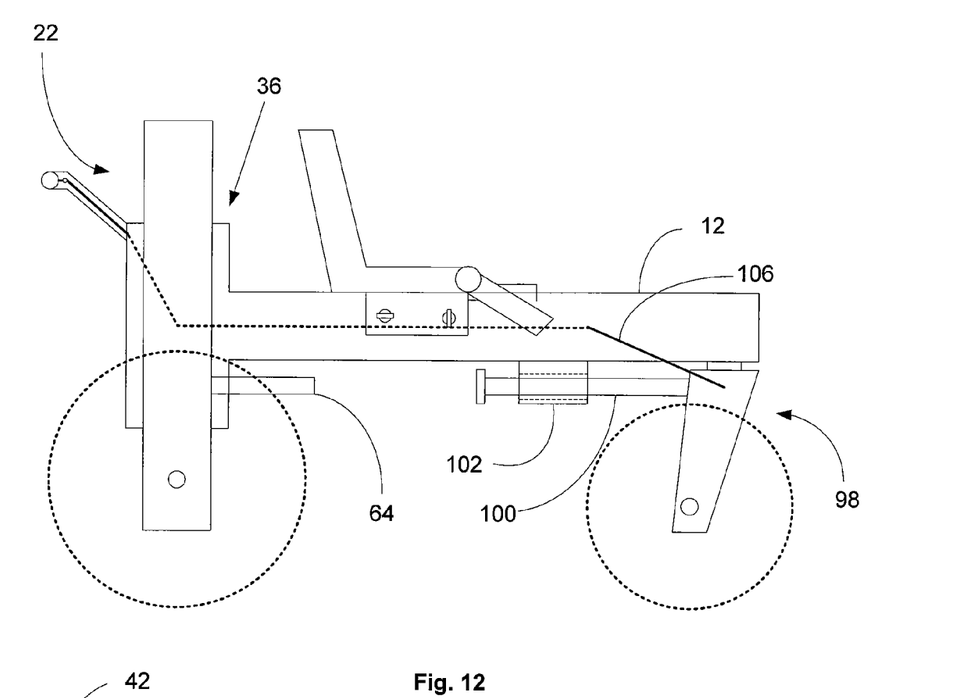
FIG. 12 is a side view of the third implementation of a steerable jogging stroller of FIG. 11 and further including a turning mechanism coupled with the front fork so that depression of a respective lever rotates the front fork right or left to assist in turning the fork relative to the boom.
Figure 13:
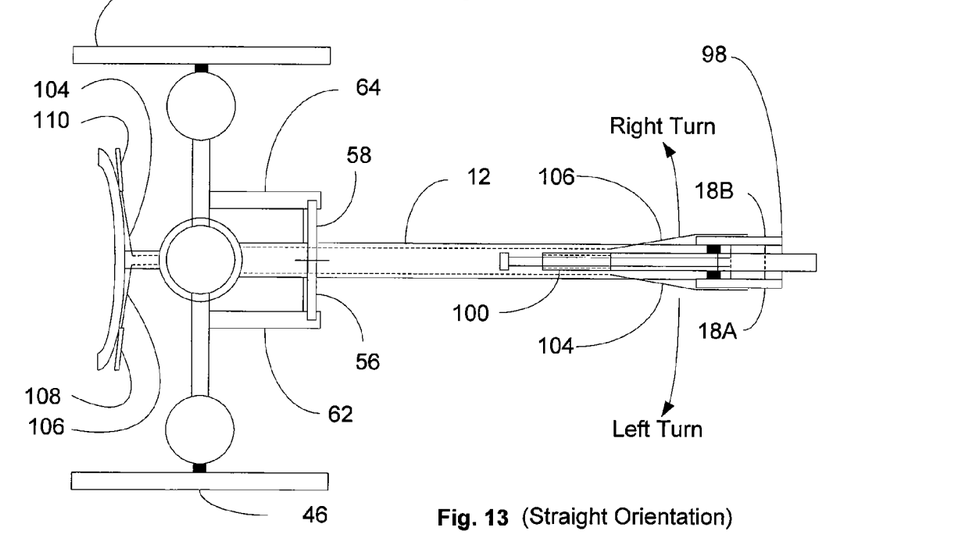
FIG. 13 is a bottom view of the steerable stroller illustrated in FIG. 12.

FIG. 10 is a bottom view highlighting the boom and centering mechanism for the embodiments shown in FIGS. 7-8. The bottom view illustrates the boom arranged in a right turn orientation and shows how the centering member is withdrawn into the channel such that the end cap is drawn toward the forward opening of the channel. Further, FIG. 10 illustrates how the centering member is deflected away from a straight orientation when the boom is turned in either direction, with FIG. 10 particularly illustrating a right turn. The centering member imparts a spring return force on the boom. Thus, when the steering force is removed from the boom, the centering member imparts a force on the retaining member to swing the boom back into the straight orientation. As with other embodiments, the centering member also causes the rear wheels to follow the front wheel during a turn.

The length of the centering member, size of the retaining member, the orientation of the retaining member along the longitudinal length of the boom, and the centering member material may all be adjusted in order to achieve the right feel for the boom during actual use and in an actual implementation of a jogging stroller conforming to aspects of the present invention. Implementations may also allow for the user to lock the boom in a straight orientation. In such an implementation, the stroller includes one or more locking pins 95 that may be inserted in an aperture in the collar that aligns with a corresponding aperture in the post when in the straight orientation. The pin may be disposed on a handle member that is normally biased in the non-engaged position. The pin is inserted through the apertures to lock the boom in the straight configuration.

As shown in FIG. 7, it is also possible to include a spring 96 between the end cap 94 and the retaining member 90. The spring may act return the centering mechanism to the straight orientation after a turn force is removed from the boom.

FIGS. 11-14 illustrate two alternative implementations of the preset invention both having a pivotally supported front wheel 98. Thus, in addition to providing a rotatable engagement between the boom and the rear frame assembly as in the embodiments set forth earlier, the embodiments of FIGS. 11-14 also include a pivotal front wheel. However, unlike some conventional running strollers that include a pivotally supported front wheel, such as through a castor type arrangement, the implementations of FIGS. 11-14 also include a centering mechanism arranged between a pivotally supported fork supporting the front wheel and the front frame or boom assembly. Thus, the front wheel is configured to return to a straight orientation after a turn. In the illustrated implementations, a centering member 100, similar to the centering member 88, extends rearwardly from the front fork assembly. The centering member is captured in a retaining member 102. Thus, when the user imparts a right turn both the boom and the front wheel orient in a right turn configuration, and when the return force is removed, both the front wheel and the boom return to a straight orientations through return forces imparted by the respective centering mechanisms.

Figure 14:
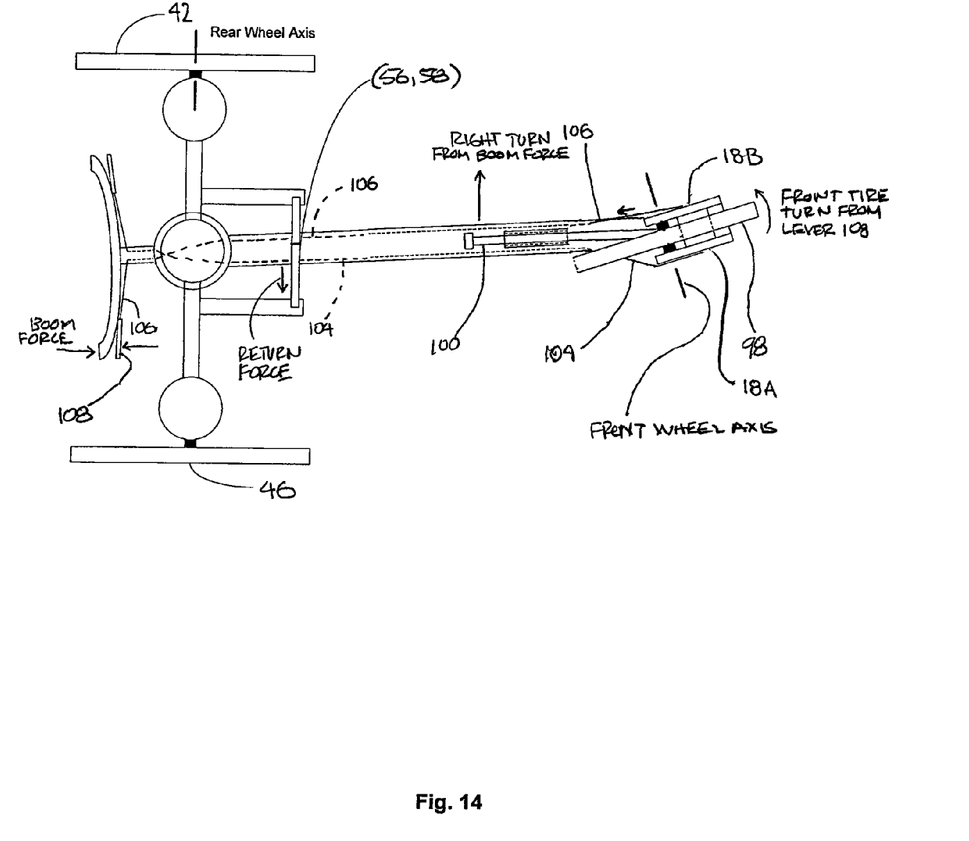
FIG. 14 is a bottom view of the steerable stroller illustrated in FIG. 12, the steerable stroller in a right turn orientation.

Additionally, pivoting of the front wheel with respect to the boom may be enhanced through first and second cables (104, 106) connected between respective fork tines (18A, 18B) and respective levers (110, 108) attached to the steering assembly at the rear of the stroller. The levers are arranged such that depression of the lever (squeezing the lever similarly to squeezing a bicycle brake lever) withdraws the respective cable and pulls on the respective fork tine. Thus, for example, when the user squeezes the right side lever 110 the cable 104 pulls the left fork tine 18A rearwardly. Pulling the left fork tine rearwardly, in turn, causes the front wheel 98 and fork to rotate left with the respect to the boom 12. Thus, by actuating the appropriate lever the front wheel is rotated. In contrast, as illustrated in FIG. 14, when the user squeezes the left side lever 108 the cable 106 pulls the right fork tine 18B rearwardly. Pulling the right fork tine rearwardly, in turn, causes the front wheel 98 to rotate right with respect to the boom. Further, by pressing on the left side of the steering bar (adjacent the left side lever, for example), the boom is also swung to the right. Both the rotation of the front wheel and the swing of the boom facilitate a right turn.

The cables may be routed through the frame or exterior to the frame in manner suitable to hold the cables and to translate force applied at the levers to the fork tines. Further, by pressing on the steering handle on the appropriate side, the boom also be swung to facilitate a turn of the stroller. Note, the left lever is connected with the right fork tine and the right lever is connected with the left tine. Thus, a user may push on the right side of the steering mechanism to facilitate a left turn, and the user may also squeeze the right lever to pull the left tine rearwardly (rotating the tire for a left turn) also facilitating a left turn. Or, the user may push on the left side of the steering mechanism to facilitate a right turn, and the user may also squeeze the left lever to pull the right tine rearwardly (rotating the tire for a right turn) facilitating a right turn. As set out above, the centering mechanisms for the boom and the rotating fork cause both to return to a straight orientation when turning forces are removed or reduced.

Implementations of the present invention may also include a rotating front fork and associated centering mechanism, but not a pivoting boom. Thus, a conventional stroller with a castored or other rotating front wheel assembly (rotating fork) may be fitted with a centering mechanism so that the wheel is normally orientated in a straight orientation and there is a limit on rotation. Thus, the wheel may turn or pivot with respect to the frame in a limited fashion described by the type of centering mechanism employed. Moreover, when a turning force is removed, the centering mechanism returns the front wheel to the straight or normal orientations of the stroller.

Although various representative embodiments of this invention have been described above with a certain degree of particularity, those skilled in the art could make numerous alterations to the disclosed embodiments without departing from the spirit or scope of the inventive subject matter set forth in the specification. All directional references (e.g., upper, lower, upward, downward, left, right, leftward, rightward, top, bottom, above, below, vertical, horizontal, clockwise, and counterclockwise) are only used for identification purposes to aid the reader's understanding of the embodiments of the present invention, and do not create limitations, particularly as to the position, orientation, or use of the invention unless specifically set forth in the claims. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other.

In some instances, components are described with reference to "ends" having a particular characteristic and/or being connected to another part. However, those skilled in the art will recognize that the present invention is not limited to components which terminate immediately beyond their points of connection with other parts. Thus, the term "end" should be interpreted broadly, in a manner that includes areas adjacent, rearward, forward of, or otherwise near the terminus of a particular element, link, component, member or the like. In methodologies directly or indirectly set forth herein, various steps and operations are described in one possible order of operation, but those skilled in the art will recognize that steps and operations may be rearranged, replaced, or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

The invention claimed is:

1. A steerable stroller comprising:
   a rear framework including a post;
   a first rear wheel and a second rear wheel rotatably supported on the rear framework;

a boom pivotally supported on the post, the boom extending forwardly from the post;
a steering member coupled with the boom, the steering member comprising a bar positioned transversely relative to the boom and including a left bar section extending leftward of the boom and a right bar section extending rightward of the boom;
at least one front wheel supported on the boom;
at least one flexible and resilient member operably coupled between the boom and the rear framework, the at least one flexible and resilient member normally biased to orient the boom in a straight orientation with the front wheel in alignment with the first and second rear wheels, the flexible and resilient member further arranged to impart a return force on the boom when the boom is pivoted about the post during a turn; and
wherein a first force applied to the left bar section facilitates a rightward pivot about the post and a second force applied to the right bar section facilitates a leftward pivot about the post.

2. The steerable stroller of claim 1 wherein the at least one flexible and resilient member comprises means for centering the boom operably coupled between the rear framework and boom.

3. The steerable stroller of claim 1 wherein the at least one flexible and resilient member comprises at least one spring coupled between the boom and the rear framework such the spring is activated when a turning force is applied when the boom is pivoted so that the front wheel is not aligned with the first and second rear wheels during a turn and imparts the return force on the boom.

4. The steerable stroller of claim 1 further comprising a fork assembly coupled with the boom and rotatably supporting the at least one front wheel.

5. The steerable stroller of claim 4 wherein the fork assembly is rotatably coupled with the boom.

6. The steerable stroller of claim 5 further comprising a first lever and a second lever operably coupled with the steering member, the first lever configured to engage a first cable coupled with the fork assembly to rotate the fork assembly in a first direction and the second lever configured to engage the second cable coupled with the fork assembly to rotate the fork assembly in a second direction.

7. The steerable stroller of claim 5 further comprising at least one elastic member coupled between the boom and the fork assembly to orient the fork assembly in the straight orientation.

8. The steerable stroller of claim 1 further comprising at least one seat assembly removably coupled with the boom.

9. The steerable stroller of claim 1 further comprising a push bar coupled with the rear framework.

10. A steerable stroller comprising:
a rear frame assembly;
a first rear wheel and a second rear wheel rotatably supported on the rear frame assembly;
a front frame assembly pivotally coupled at a pivot location with the rear frame assembly;
at least one front wheel supported on the front frame assembly;
at least one seat operably supported on the front frame assembly, the at least one seat being positioned at or above the pivot location,
a centering mechanism coupled between the front frame assembly and the rear frame assembly, the centering mechanism configured to normally orient the frame assembly in a straight orientation with the front wheel in alignment with the first and second rear wheels, the centering mechanism further arranged to impart a return force on the frame assembly when the frame assembly is pivoted with respect to the rear frame assembly while executing a turn; and a steering member coupled with the boom, the steering member comprising a bar positioned transversely relative to the boom and including a left bar section extending leftward of the boom and a right bar section extending rightward of the boom, wherein a first force applied to the left bar section facilitates a rightward pivot about a rear frame assembly and a second force applied to the right bar section facilitates a leftward pivot about a rear frame assembly.

11. The steerable stroller of claim 10 wherein the front frame assembly comprises a boom pivotally coupled with the rear frame assembly so that the boom pivots left and right with respect to the rear frame assembly, the boom supporting a fork rotatably supporting the front wheel.

12. The steerable stroller of claim 11 wherein the centering mechanism comprises at least one flexible and resilient member operably coupled between the boom and the rear frame assembly.

13. The steerable stroller of claim 12 wherein the fork is pivotally coupled with the boom assembly so that the front wheel turns left and right with respect to the boom.

14. The steerable stroller of claim 13 further comprising:
a steering member coupled with the boom; and
a first lever and a second lever operably coupled with the steering member, the first lever configured to engage a first cable coupled with the fork assembly to rotate the fork assembly to turn the front wheel left with respect to the boom and the second lever configured to engage the second cable coupled with the fork assembly to turn the front wheel right with respect to the boom.

15. The steerable stroller of claim 14 further comprising a push bar coupled with the rear frame assembly.

16. The stroller of claim 10 wherein the centering mechanism comprises: a flexible resilient member coupled between the front frame assembly and the rear frame assembly, the flexible resilient member aligned with a longitudinal center line of the stroller.

17. The stroller of claim 16 wherein the flexible resilient member is fixedly coupled with the rear frame assembly and the flexible resilient member is captured in a retaining member coupled with the front frame assembly, the retaining member defining a channel to capture the flexible resilient member.

18. The steerable running stroller of claim 14 further comprising a second centering mechanism coupled between the boom and front fork assembly, the second centering mechanism configured to normally orient the frame assembly in a straight orientation with the front wheel in alignment with the first and second rear wheels, the centering mechanism further arranged to impart a return force on the front fork when the front fork assembly is pivoted with respect to the boom while executing a turn.

19. A steerable running stroller comprising:
a rear frame assembly;
a first rear wheel and a second rear wheel rotatably supported on the rear frame assembly;
a front frame assembly pivotally coupled with the rear frame assembly, the front frame assembly including a steering member fixedly coupled with the front frame assembly, the steering member positioned rearwardly of the pivotal coupling and including a transverse bar including a left bar section and a right bar section;
at least one front wheel supported on the front frame assembly forwardly of the pivotal coupling;

at least one seat operably supported on the front frame assembly between the pivotal coupling and front wheel;

a centering mechanism coupled between the front frame assembly and the rear frame assembly, the centering mechanism configured to normally orient the frame assembly in a straight orientation with the front wheel in alignment with the first and second rear wheels, the centering mechanism further arranged to impart a return force on the frame assembly when the frame assembly is pivoted with respect to the rear frame assembly while executing a turn; and wherein a first force applied to the left bar section facilitates a rightward pivot about the post and a second force applied to the right bar section facilitates a leftward pivot about the post.

* * * * *